United States Patent [19]
Rees et al.

[11] 3,821,022
[45] June 28, 1974

[54] INTUMESCENT COATED CROSSLINKED POLYOLEFINS

[75] Inventors: Robert L. Rees, Bartlesville, Okla.; George E. Williams, Brighton, Mich.

[73] Assignee: Phillips Petroleum Company, Bartlesville, Okla.

[22] Filed: May 30, 1972

[21] Appl. No.: 257,873

[52] U.S. Cl............ 117/137, 117/95, 117/136, 117/138.8 E, 220/64, 220/88 R
[51] Int. Cl............ B32b 27/32, C09d 5/18
[58] Field of Search............ 117/138.8 E, 136, 137, 117/138, 95; 260/94.9 GA; 220/88 R, 64

[56] References Cited
UNITED STATES PATENTS

| | | | |
|---|---|---|---|
| 2,676,162 | 4/1954 | Marotta | 117/137 X |
| 2,973,241 | 2/1961 | Scott et al. | 117/138 X |
| 3,135,419 | 6/1964 | Bulmer | 220/88 X |
| 3,214,422 | 10/1965 | Mageli et al. | 260/610 R |
| 3,284,216 | 11/1966 | Kaplan | 117/137 X |
| 3,322,612 | 5/1967 | Burd | 117/137 X |
| 3,422,048 | 1/1969 | Cannelongo | 117/136 X |
| 3,627,728 | 12/1971 | Fernandes et al. | 260/94.9 GA |

*Primary Examiner*—Michael Sofocleous
*Assistant Examiner*—Harry J. Gwinnell

[57] ABSTRACT

Articles of manufacture are described comprising crosslinked polyolefins having intumescent coatings thereon. Said articles are self supporting and substantially retain the shape of the original articles even after exposure to pryolysis and/or combustion temperatures of up to 2,500° F.

8 Claims, No Drawings

INTUMESCENT COATED CROSSLINKED POLYOLEFINS

This invention relates to articles of manufacture comprising crosslinked polyolefins having intumescent coatings.

The use of intumescent coatings to protect flammable substrates is well known in the art. However, attempts to use intumescent coatings to protect polyolefin substrates heretofore have been unsuccessful since the polyolefin substrates heretofore employed have failed to provide an adequate support for an intumescent coating at temperatures of about 250° F or higher. This characteristic inadequacy of polyolefin substrates to provide a suitable support for intumescent coating at elevated temperatures has restricted the use of polyolefins in combination with intumescent coatings as a convenient and/or economical means of manufacturing intumescent coated self supporting flame retardant polyolefin articles.

It is an object of this invention to provide intumescent coated polyolefin articles wherein the polyolefin substrate is self supporting and provides a suitable substrate base for an intumescent coating at temperatures above about 250° F. Another object is to provide self supporting flame retardant articles of manufacture comprising extruded, thermoformed, blow-molded, injection molded, or rotationally molded polyolefin articles having an intumescent coating applied thereto. These and other objects will be apparent from the written description and the appended claims.

In accordance with this invention a new and improved article of manufacture is provided comprising a cross-linked polyolefin wherein at least a portion of said polyolefin has an intumescent coating.

The cross-linked polyolefins that can be employed in the practice of this invention can be prepared by cross linking a polyolefin selected from ethylene homopolymers, copolymers of ethylene and at least one acrclic 1-monoolefin having from three to eight carbon atoms per molecule, and mixtures thereof, wherein the uncross-linked polyolefin is characterized by a density range of from about 0.940 to 0.970 as determined by ASTM D 1505-68.

Suitable cross-linking agents that can be employed to form the crosslinked polyolefin comprises any peroxy compound which under suitable crosslinking process conditions will provide a cross-linked polyolefin having a density within the range of from about 0.930 to about 0.940. Preferred cross-linking agents are acetylenic diperoxy compounds which have molecular weights within the range of from about 230 to about 550 that can be represented by the formula:

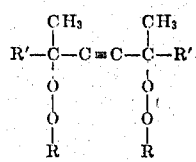

wherein each R is the same or different and is independently selected from the group consisting of tertiary alkyl, alkyl carbonate and alkyl benzoate radicals, each R' is the same or different and is independently selected from methyl and ethyl radicals. Further illustrative of suitable peroxy compounds are the following specific chemicals: 2,7-dimethyl-2,7-di(t-butylperoxy)octadiyne-3,5, 3,6-dimethyl-3,6(t-butylperoxy)octyne-4, 2,5-dimethyl-2,5-di(peroxy-n-propyl carbonate)hexyne-3, 2,5-dimethyl-2,5-di(alphacumyl peroxy) hexyne-3, 2,5-dimethyl2,5-di(peroxy beta-chloroethyl carbonate) hexyne-3 and the like and mixtures thereof.

The intumescent coatings which can be employed in the practice of this invention include any suitable intumescent composition which, on heating, forms large amounts of incombustible, or nearly so, residue while at the same time forms a cellular foam with good insulating properties. Representative intumescent coatings which are generally useful comprise compositions that contain (a) sources of carbonaceous materials suitable for char formation, such as sugars, polyhydric alcohols, polyhydric phenols, starches, and the like, (b) dehydrating agents such as ammonium phosphates, amine phosphates, phosphate esters, and borates, and (c) blowing agents such as dicyandiamide, melamine, guanidine, glycine, urea, chlorinated paraffin (70 percent chlorine) and the like. Other materials can be added to the coatings to improve toughness of the carbon foams such as amino plasts, i.e., urea-or melamine-formaldehyde resins, which are believed to form a tough skin over the cellular foam. Preferred intumescent coatings comprise latex base coatings.

The cross-linked polyolefin compositions employed in the practice of this invention can be prepared by forming or shaping admixtures of cross-linking agent and uncross-linked polyolefin in suitable proportions at suitable temperatures and pressures to form a cross-linked polyolefin as stated hereinbefore having a density of about 0.930 to about 0.940. Since the amount of cross-linking agent employed in any given process will depend upon the mass, size, shape, etc., of the object being formed as well as the time and temperatures employed during cross-linking of the polyolefin, the proportions of cross-linking agent to polyolefin can vary widely, however preferably at least 0.1 part up to about 10 parts of acetylenic diperoxy compound is employed per 100 parts of uncross-linked polyolefin. In general, the cross-linking temperatures that can be employed vary widely, however suitable cross-linking temperatures generally are within the range of from about 250° F to about 650° F. The cross-linking time period can vary widely, however generally suitable time periods are within the range of from about 1/10 of a second up to 5 hours.

Any amount of intumescent coating can be applied to the cross-linked polyolefin substrate in accordance with this invention. In general, an intumescent coating within a range of from about 1 to 1,000 mils of intumescent coating per inch of thickness of cross-linked polyolefin substrate provides sufficient intumescent material to protect the cross-linked polyolefin substrate from the direct pyrolysis and/or combustion products of a gas flame temperature in the range of from about 2,000° to 2,500° F for a period of 5 minutes. In general the intumescent coating should be a contiguous and continuous coating.

In general the intumescent coated cross-linked polyolefins of this invention, when employed in the form of sheets, films, tubes, containers, fibers, filaments, and the like, are effective in controlling and containing the pyrolysis and combustion products commonly associated with such items as burning wood, paper, textiles, plastics, polymers, and the like.

Set out hereafter are examples which illustrate the practice of this invention.

EXAMPLE I

A series of runs was carried out to determine the ability of both uncross-linked and cross-linked polyolefin substrates having intumescent coatings to remain self-supporting while the intumescent coating was in direct contact with an open flame. The intumescent coated polyolefin compositions were evaluated according to the following procedure. Samples one-eighth inch thick, five inches square, of both uncross-linked and cross-linked polyolefin compositions having one side intumescent coated were individually supported on a four and one-half inch diameter ring located seven inches above a Fisher 120-21 burner having a 1½ inch diameter grid. A flame extending upwardly to the intumescent-coated surface was adjusted so that the tip of the flame just touched the intumescent coating. On the opposite side from the coating a 1½ inch diameter hemispherical steel ball weighing approximately 130 grams was suspended directly above the vertical axis of the gas flame. Both the gas flame and the steel ball were positioned directly in the middle of the sample under test. The approximately 5 mil thick intumescent coated surfaces of all samples were continuously exposed to a gas flame at a flame burst temperature of 2,500° F. Each run consisted of three samples exposed to the flame. The average time required for the 1½ inch diameter ball to pass completely through the three nonintumescent-coated and the three intumescent-coated uncross-linked polyolefin samples was recorded. The results of said tests are set out in Table I hereafter.

tumescent-coated and intumescent-coated cross-linked polyolefin substrates to initially support combustion for a period of five seconds or more continuously in the absence of an open flame.

TABLE II

Open Flame Test Results — Cross-linked Polyolefins

| Run No. | 1 | 2 |
|---|---|---|
| Polyolefin Properties | | |
| Density in grams per cc | .930–.933 | .930–.933 |
| Vicat Softening Point, °F | 240 | 240 |
| Crystalline Melting Point, °F | Indeterminate | Indeterminate |
| Intumescent Coating[1] | No | Yes |
| Average Time in seconds | 114 | 270 |

[1] As defined hereinbefore in Table I.

EXAMPLE II

A series of tests were carried out to determine the ability of noncross-linked and cross-linked polyolefin intumescent coated containers to contain the combustion and pyrolysis products of burning paper. Identical containers having no intumescent coatings were used for control purposes. The polyolefin containers were made on a McNeil 200-32 Rotational Molding Machine charged with 400 grams of cross-linked polyethylene, at 550° oven temperature, heated for 14 minutes, followed by 2 minutes of fog spray and 2 minutes of 82° F water cascade. After molding the top was cut out, forming an open top container which weighed approximately 290 grams. All the containers were similar in size, 8 inches high, 7 inches in diameter, with a wall thickness of about 0.65 inch. Each container was filled with newspaper, which was ignited, and allowed to

TABLE I

Open Flame Test Results — Uncross-linked Polyolefins

| Run No. | 1 | 2 | 3 | 4 |
|---|---|---|---|---|
| Polyolefin Properties | | | | |
| Density in grams per cc | .955 | .955 | .955 | .955 |
| Vicat Softening Point, °F (ASTM D 1525-65T) | 200 | 200 | 200 | 200 |
| Crystalline Melting Point, °F | >250 | >250 | >250 | >250 |
| Melt Index (ASTM 1238-65T) | 18 | 18 | 6.5 | 6.5 |
| Intumescent Coatings[1] | No | Yes | No | Yes |
| Average Time in seconds | 79 | 83 | 74 | 106 |

[1] A solvent based modified vinyl coating containing carbonaceous materials and a foaming agent which reacts to flame or heat at 300°F (Albi Mfg. Co. Coating 107A).

No measurable surface penetration by the 130 gram steel ball occurred during exposure of the intumescent-coated cross-linked polyolefin substrates to flame burst temperatures of 2,500° F. The average time in seconds defined in Table II is the time required for the noninburn uninterruptedly until all the newspaper had been consumed in a combustion process at a temperature of about 450° F. The temperatures of the tests correlated with the particular polyolefin employed and the results are tubulated in Table III hereafter.

TABLE III

Open Flame Test Results

| Run No. | Uncross-linked Polyolefins | | Cross-linked Polyolefins | |
|---|---|---|---|---|
| | 1 | 2 | 3 | 4 |
| Polyolefin Properties Intumescent Coating[1] Remarks | No Container softened, collapsed and completely burned up. | Yes Container softened and slumped badly exposing uncoated areas to open flame which thereafter ignited and completely burned. | No Container bottom burned, melted and stuck to the concrete test surface. | Yes Container exhibited minor distortion with no slumping of the container sides. |

[1]As defined hereinbefore in Table 1.

As illustrated by the above examples, intumescent coated cross-linked polyethylene articles, in the form of containers, such as waste baskets, are self supporting as well as resistant to pyrolysis and/or combustion temperatures within a temperature range of from 450° to 2,500° F.

Further modifications of the teachings of this invention employing cross-linked polyethylene and intumescent coating as articles of manufacture will be apparent to those skilled in this art.

What is claimed is:

1. An article of manufacture formed of a polyolefin selected from the group consisting of ethylene homopolymers, copolymers of ethylene and at least one acyclic 1-monoolefin hydrocarbon having three to eight carbon atoms per molecule, and mixtures thereof, wherein said polyolefin has been cross-linked with a suitable cross-linking compound, and wherein at least a portion of said article has an intumescent coating thereon.

2. An article according to claim 1 wherein the cross-linked polyolefin is characterized by a density within the range of from about 0.930 to about 0.940, and wherein the cross-linked polyethylene substrate contiguous to said coating retains substantially the original substrate form after said coating has been subjected to direct pyrolysis or combustion at temperatures up to 2,500° F.

3. An article according to claim 2 wherein said cross-linked polyolefin is prepared by contacting an uncross-linked polyolefin characterized by a density within the range of from about 0.940 to 0.970 with an acetylenic diperoxy compound under suitable cross-linking temperatures and pressures.

4. An article according to claim 3 wherein said acetylenic diperoxy compound has a molecular weight within the range of from about 230 to about 550 and is represented by the formula:

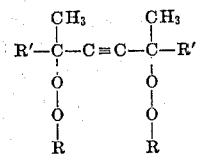

wherein each R is the same or different and is independently selected from the group consisting of tertiary alkyl, alkyl carbonate and alkyl benzoate radicals, and each R' is the same or different and is independently selected from the group consisting of methyl and ethyl radicals.

5. An article according to claim 4 wherein said article retains substantially the original article form after said coating has been subjected to pyrolysis or combustion temperatures up to 2,500° F.

6. An article according to claim 5 wherein said article contains a cavity and the entire wall of said cavity is covered with said intumescent coating.

7. An article according to claim 6 wherein said intumescent coating comprises carbonaceous materials, dehydrating agents, blowing agents, and said coatings react to flame or heat at temperatures of about 300° F.

8. An article according to claim 7 wherein said article is a waste paper basket container.

* * * * *